United States Patent [19]

Hamada et al.

[11] Patent Number: 4,734,571

[45] Date of Patent: Mar. 29, 1988

[54] FOCUS CONDITION DETECTING DEVICE HAVING CORRELATION CALCULATION MEANS AND MEANS FOR DETERMINING THE RANGE OF SHIFTS OF IMAGE SIGNALS

[75] Inventors: Masataka Hamada, Minamikawachi; Tokuji Ishida, Daito; Toshihiko Karasaki; Toshio Norita, both of Sakai; Nobuyuki Taniguchi, Nishinomiya, all of Japan

[73] Assignee: Minolta Camera Kabushiki Kaisha, Osaka, Japan

[21] Appl. No.: 924,888

[22] Filed: Oct. 30, 1986

[30] Foreign Application Priority Data

Oct. 30, 1985 [JP] Japan .................... 60-245130

[51] Int. Cl.⁴ .......................... G01J 1/20; G03B 3/00; G03B 13/18
[52] U.S. Cl. ...................... 250/201; 354/406
[58] Field of Search ................ 250/201 PF, 201 AF; 354/406, 407, 408

[56] References Cited

U.S. PATENT DOCUMENTS

| 4,387,975 | 6/1983 | Araki | 354/25 |
| 4,492,448 | 1/1985 | Ishikawa et al. | 354/406 |
| 4,523,829 | 1/1985 | Eguchi et al. | 354/406 |
| 4,561,749 | 12/1985 | Utagawa | 354/406 |
| 4,573,784 | 3/1986 | Suzuki | 354/406 |
| 4,636,624 | 1/1987 | Ishida et al. | 250/201 |
| 4,647,174 | 3/1987 | Tsunekawa et al. | |

FOREIGN PATENT DOCUMENTS 56-78811 6/1981 Japan .
60-4913 1/1985 Japan .

OTHER PUBLICATIONS

U.S. patent application Ser. No. 735,569, filed May 17, 1985.
U.S. patent application Ser. No. 945,879, filed Dec. 23, 1986.

*Primary Examiner*—David C. Nelms
*Assistant Examiner*—William L. Oen
*Attorney, Agent, or Firm*—Price, Gess & Ubell

[57] ABSTRACT

There is disclosed a focus condition detecting device for a camera.

The focus condition detecting device has a preliminary correlation calculation means for calculating correlations between first and second image signals with a relatively low accuracy and a principal correlation calculation means for calculating correlations between first and second image signals with a relatively high accuracy on the basis of data obtained in the preliminary correlation calculation.

11 Claims, 8 Drawing Figures

FOCUS CONDITION DETECTING DEVICE HAVING CORRELATION CALCULATION MEANS AND MEANS FOR DETERMINING THE RANGE OF SHIFTS OF IMAGE SIGNALS

BACKGROUND OF THE INVENTION

1. Field of the Invention

The present invention relates to a focus condition detecting device for a camera which detects focus condition of an objective lens of the camera from an object image received passing through the objective lens.

2. Description of the Prior Art

There has been known a focus condition detecting device in which two object images are formed by re-focusing two object light bundles having been passed through a first and second areas of an objective lens being symmetric to each other with respect to the optical axis thereof, a relative position relation between these two object images is calculated due to correlation calculation and then, the shift distance of the focus position from the predetermined focus position and the direction of the shift (namely whether forward or rearward with respect to the predetermined focus position) are obtained due to calculation according to a predetermined algorism. An optical system for the focus condition detecting device of this type is shown in FIG. 6. As shown in FIG. 6, this optical system includes a condensor lens 6 being arranged on the predetermined focal plane set behind the objective lens 2 or on a plane set behind the predetermined focal plane and re-focusing lenses 8, 10 being arranged rearward of the condensor lens 6 and, there are arranged two line sensors 12, 14 on focal planes of the re-focusing lenses 8, 10, respectively. As the line sensors, a linear array of CCD (charge coupled device) elements can used desirably.

As shown in FIG. 7 schematically, two object images re-focused by lenses 8, 10 are formed approached toward the optical axis 18 of the objective lens if an object image is focused forward of the predetermined focal plane, and are formed apart from the optical axis 18 respectively if the object image is focused rearward of it.

When the object image is focused just on the predetermined focal plane, the distance between two points corresponded to each other on the object images re-focused becomes equal to a specified value which is determined by the composition of the optical system. Accordingly, the focus condition can be obtained, in principle, by detecting the distance between a point on the first object image and one point on the second object image corresponding to the former point. In the optical system shown in FIG. 6, this distance is calculated by a correlation calculation means 16 from signal data outputted from line sensors 12, 14.

The camera installing such a focus condition detecting device as mentioned above is used for taking not only a picture of a static object but also a picture of an object moving fast. Accordingly, the focus condition detecting device should have a very short detection time for detecting a focus condition.

Moreover, in a single eye reflex camera, a very high accuracy is required for detecting the focus condition and, accordingly, the focus condition detecting device is required to have a high accuracy about the detection of focus condition in order to adapt to the single eye reflex camera.

In the detection of focus condition with use of the device mentioned above, results obtained by repeating the detection with respect to a same object positioned at a constant distance from the camera do not coincide with each other when the object is moving in a plane vertical to the optical axis of the objective lens, or when the camera is subjected to small vibration by being held by unsteady hands so that they distribute about a center value with a certain fluctuation. In other words, the accurate focus detection data can not be obtained only by a single detecting operations.

This uncertainty in the focus condition detection is considered to be caused by factors as follows; unevenness with respect to characteristic of each element of each line sensor and the alignment thereof, unstability of the processing circuit used, and difficulty in correct detection of signal components having frequencies higher than the spatial frequency determined by the sampling theorem of Nykist due to spatial frequency characteristic of the line sensors determined by the pitch of elements aligned linearly upon measuring the illumination distribution on the line sensor (which corresponds to the brightness distribution of the object) and, also, impossibility of detection of exact illumination distributions on the line sensors due to existance of a blind zone between adjacent elements of the line sensors.

In the Japanese-Laid Open Publication No. 78811/1981, there is proposed an automatic focus adjusting device in which the focus adjustment is carried out according to an average of a plurality of defocus data obtained by repeating the focus condition detections.

However, this device has an essential disadvantage in that it is impossible to carry out a quick focus adjustment since the objective lens is started to drive after the average has been obtained by repeating detection operations while keeping the objective lens stopped.

In order to solve this problem, there have been proposed devices A to C as mentioned hereinbelow.

A: wherein the line sensor is devided into two or more blocks, these blocks are used selectively according to the degree of defocusing and the number of sensor elements (cells) contained in the block used for the zone apart from the in-focus zone is reduced in comparison with that of the block used for in-focus zone. (See, for instance Ishida et al. copending U.S. patent application Ser. No. 570,012 filed on Jan. 10, 1984 and assigned to the same assignee to that of the present application).

B: wherein the number of elements (cells) used for the correlation calculation is switched in order according to the amount of defocus (See U.S. Pat. No. 4,573,784).

C: wherein filtering property upon sampling image data and/or sampling width (or the sampling number) are switched according to the amount of defocus (See U.S. Pat. No. 4,561,749).

According to these devices A to C, calculations of a rough value and a precise value regarding the amount of drive of the objective lens are carried out by changing the element number or the sampling width or number of each line sensor.

This is based on the idea that it should take precedence over the exact calculation of the focus position to move the objective lens quickly to a position near to the focus position according to a rough estimation about the driving amount of objective lens in such a condition that the amount of defocus is too large and, therefore it is only time-consuming to calculate the driving amount of the objeive lens based on sampling data having a high accuracy.

SUMMARY OF THE INVENTION

One essential object of the present invention is to provide a focus condition detecting device which can detect the focus condition of an objective lens with a high accuracy in a short time.

The focus condition detecting device according to the present invention has preliminary correlation calculation means for effecting a preliminary correlation calculation which includes calculation of a plurality of correlation degrees between the first and second image signals with a predetermined lower accuracy by repeated shifting of the first and second image signals relative to one another and determination of a highest correlation degree among the calculated correlation degrees and of the number of the shifts providing the highest correlation degree and principal correlation calculation means for effecting a principal correlation calculation which includes calculation of a plurality of calculation degrees between the first and second image signals with a predetermined higher accuracy by repeated shifting of the first and second image signals relative to one another and determination of a highest correlation degree among the calculated correlation degrees and of the number of the shifts providing the highest correlation degree.

Namely, the focus condition detecting device carries out the preliminary calculation for estimating a focus condition roughly and then, carries out the pricipal correlation calculation for seeking for an exact focus condition based upon the focus position having been estimated by the preliminary calculation.

According to the present invention, the number of the processes of the correlation calculation needed for seeking for the exact focus condition can be reduced when compared with that of the prior art.

Therefore, the detection of focus condition can be made faster than that according to the conventional method in which correlation calculation is carried out repeatedly while shifting the image signals of the line sensors relative to one another over the entire range available for the shifting.

BRIEF DESCRIPTION OF THE DRAWING

The present invention will now be described more in detail by way of examples and with reference to the accompanying drawings in which.

DESCRIPTION OF THE PREFERRED EMBODIMENT

Figure 1:
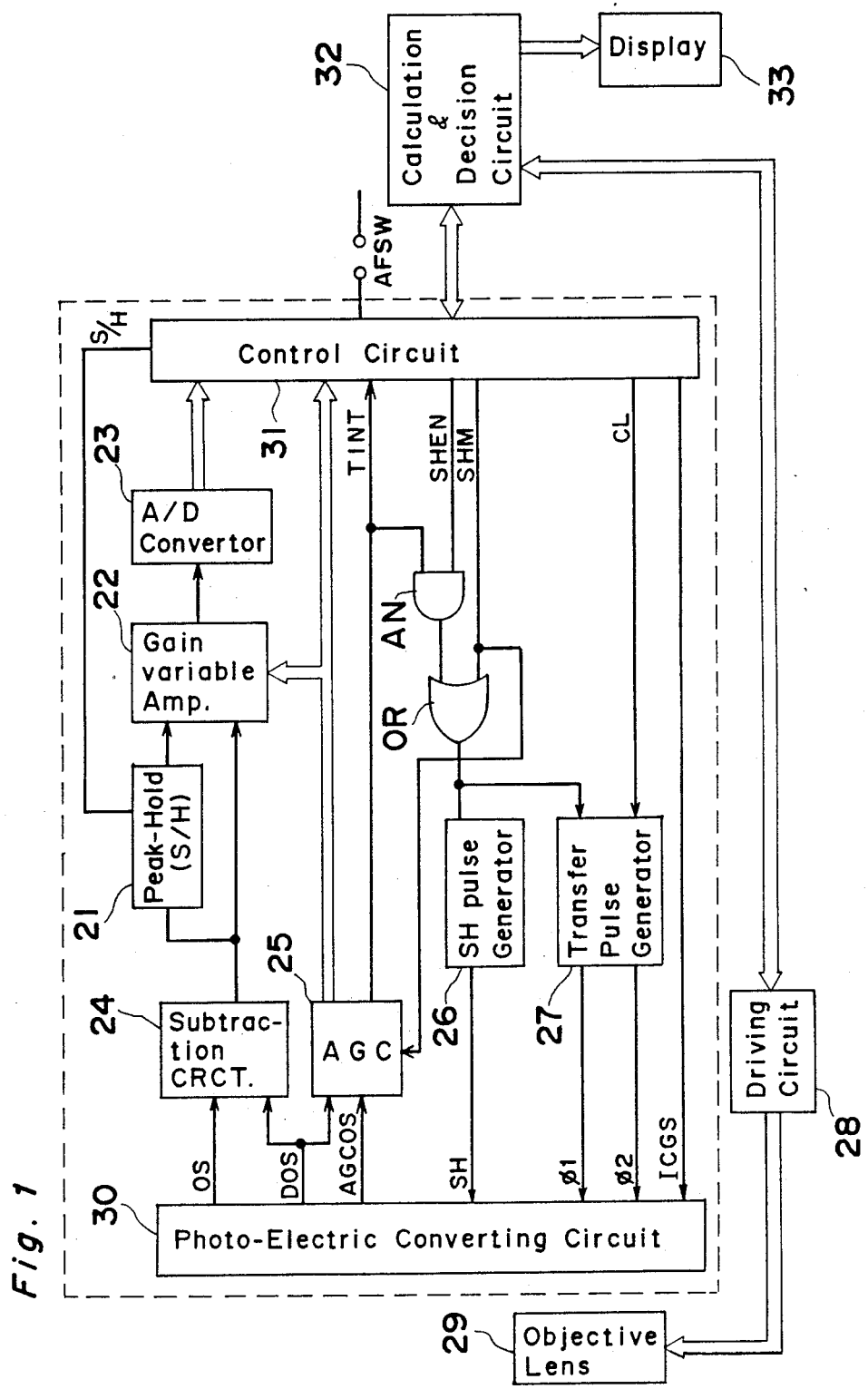
FIG. 1 is a block diagram of the focus condition detecting device according to the present invention.

FIG. 1 shows a block diagram of the focus condition detecting device according to the present invention. A control circuit 31 being comprised of a microcomputer is started to detect a focus condition when a shutter-release button (not shown) is pushed down by a half stroke during a switch AFSW for focus condition detection mode is switched ON.

At first an integral-clear pulse signal ICGS is outputted to a photo-electric transducer circuit 30. The photo-electric transducer circuit 30 includes a CCD (charge coupled device) image sensor as first and second photo-electric transducer devices (See FIG. 2). When the integral-clear signal ICGS is applied to the photo-electric transducer circuit 30, all sensing elements of the CCD image sensor are reset to their initial states and the output AGCOS of brightness monitoring circuit (not shown) installed in the CCD image sensor is raised to a level near to that of a voltage source.

At the same time, the control circuit 31 outputs a signal SHEN of "High" level for allowing generation of a shift-pulse.

When the integral clear signal ICGS is disappeared, an integration for a photo-current is started in each element of CCD image sensor of the photo-electric transducer circuit 30 and the output AGCOS of the brightness monitoring circuit is lowered at a velocity corresponding to the brightness of an object while a standard signal DOS outputted by a standard signal generating circuit (not shown) installed in the photo-electric transducer circuit 30 is kept at a constant standard level.

An auto-gain control circuit 25 compares the signal AGCOS with the standard signal DOS to obtain a degree how the signal AGCOS is dropped against the standard signal within a predetermined time interval (for example 100 msec.) and controls the gain of a differential amplifier 22 of a gain variable type. Also, the gain control circuit 25 outputs a signal TINT of "High" level at the time when the signal AGCOS is dropped by a predetermined level or more within the predetermined time interval after the drop of the signal ICGS. The signal TINT is input, via an AND gate AN and an OR gate OR, into a shift pulse generating circuit 26 and the shift pulse generating circuit 26 outputs a shift pulse SH when received the signal TINT. At the time that the shift pulse SH is input into each CCD image sensor of the photo-electric transducer circuit 30, the integration of photo-current by each sensing element is ceased and electric charges each corresponding to an integrated value are transmitted parallel from the sensing elements of the CCD image sensor to cells of a shift register corresponding to sensing elements of the CCD image sensor.

Meanwhile, a tranfer pulse generating circuit 27 generates two sensor driving pulses $\phi_1$ and $\phi_2$ having phases different from each other by $\pi$ radian according to clock pulses being outputted from the control circuit 31. These sensor driving pulses are applied to the photo-electric transducer circuit 30. The CCD image sensor of the photo-electric transducer circuit 30 discharges the charge of each element of the CCD shift register one by one from one end thereof in a manner synchronized with the timing of rise of the pulse $\phi_1$. Each charge signal OS representing an image signal is input into a subtraction circuit 24. The signal OS has a higher voltage as the intensity of incident light into the corresponding element becomes lower. The subtraction circuit 24 substracts the OS signal from the standard signal DOS and outputs the substracted signal (DOS−OS) as a picture element signal.

If the predetermined time was over with no signal TINT to be outputted from th auto-gain controller 25 after the disappearance of the integration clear signal, the control circuit 31 outputs an instruction signal SHM for generating the shift pulse in place of the signal TINT. Corresponding to this instruction signal SHM, the shift pulse generating circuit 26 generates a shift pulse SH.

The control circuit 31 outputs a sample-hold signal S/H when element signals corresponding to elements from seventh to tenth are outputted from the photo-electric transducer circuit 30. These elements of the CCD image sensor are covered with an aluminium mask for the purpose to remove dark current components included in the image signal and, therefore, are shuttered off against the incident light. A peak-hold circuit 21 holds the difference between the standard signal DOS and the output OS corresponding to the masked portion of the CCD image sensor and, thereafter, this differential signal and the element signal are input into a gain variable amplifier 22. The gain variable amplifier 22 amplifies a difference between the element signal and the differential signal with a gain controlled by the auto gain-controller 25. The amplified output thereof is converted to digital data by an analogue-digital conventor 23 and, then, the converted digital data is input into the control circuit 31 as an image signal data.

The A/D conversion by the A/D converter 23 is done in a unit of eight bits but data of top four bits and data of bottom four bits are separately transmitted to the control circuit 30.

Thereafter, the control circuit 31 stores the image signal data in the internal memory thereof. When the control circuit 31 has completed to memorize all image signal data, it gives all memorized data to a calculation dicision circuit 32. The calculation and dicision circuit 32 calculates an amount of defocus and a direction thereof based upon given data according to programs provided therefor. The circuit 32 drives a lens driving mechanism 28 according to the amount of defocus and the direction thereof in order for the automatic focusing adjustment of an objective lens 29 and also control a display circuit 33 so as to display these data.

Figure 2:
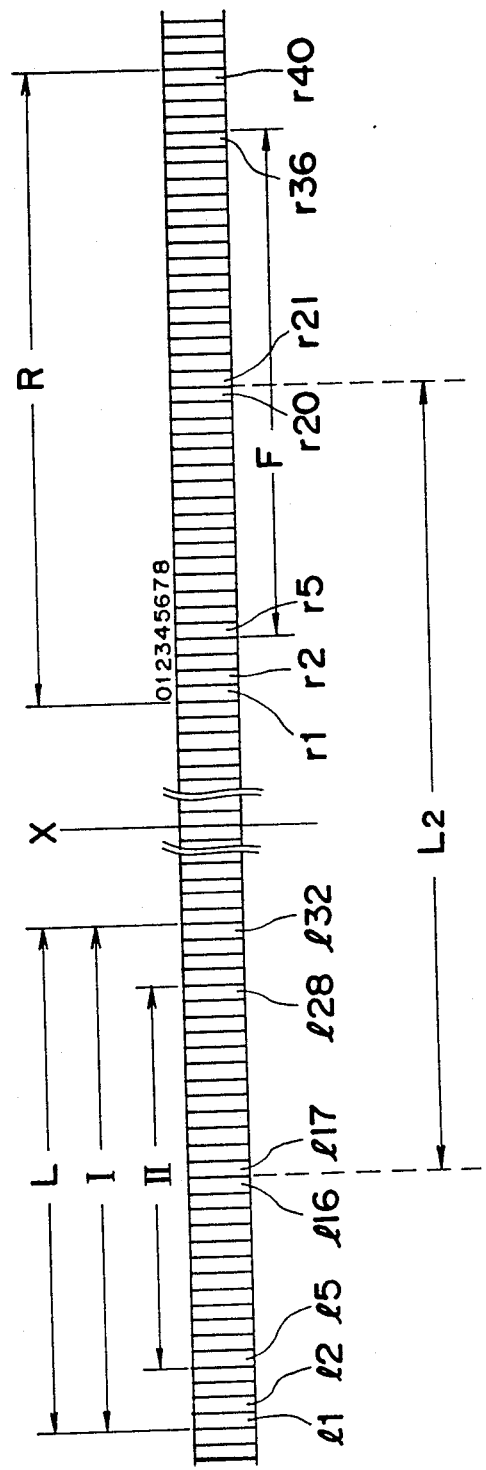
FIG. 2 is an explanative view for showing the structure of an array of photo-sensitive elements.

FIG. 2 shows an enlarged front view of the CCD image sensor according to the present invention.

In this embodiment the first and second line sensor namely image sensors are formed by two separate portions L and R of one line sensor. A reference symbol X denotes the position through which the optical axis passed. Outputs from picture elements being located near the passing position X, are not used as image signals.

The first portion L is defined as a standard portion which is comprised of thirty two elements $1_1$ to $1_{32}$. Further, a first block I comprised of elements from $1_1$ to $1_{32}$ and a second block II comprised of elements from $1_5$ to $1_{28}$ are defined in the standard portion, respectively. Above the standard portion L, there is provided a photo sensitive device (not shown in FIG. 2) for monitoring the illumination to these elements.

The second portion R is defined as the reference portion. The reference portion R is comprised of forty elements from $r_1$ to $r_{40}$ more than those of the standard portion L. The line sensor is so designed as to coincide the image data on the elements from $r_5$ to $r_{36}$ of the reference portion R with those on the elements from $1_1$ to $1_{32}$ of the standard portion L when the objective lens is positioned so as to focus the object image formed by the objective lens on the predetermined focal plane. In this meaning, the block comprising elements from $r_5$ to $r_{36}$ is defined as a focusing block F and a distance between the boundary of the elements $1_{16}$ and $1_{17}$ (namely the center position of the standard portion L) and the boundary of the elements $r_{20}$ and $r_{21}$ (namely the center position of the reference portion R) is defined as the criterion image distance $L_2$ which indicates that the exact in-focus condition is achieved.

Figure 3:
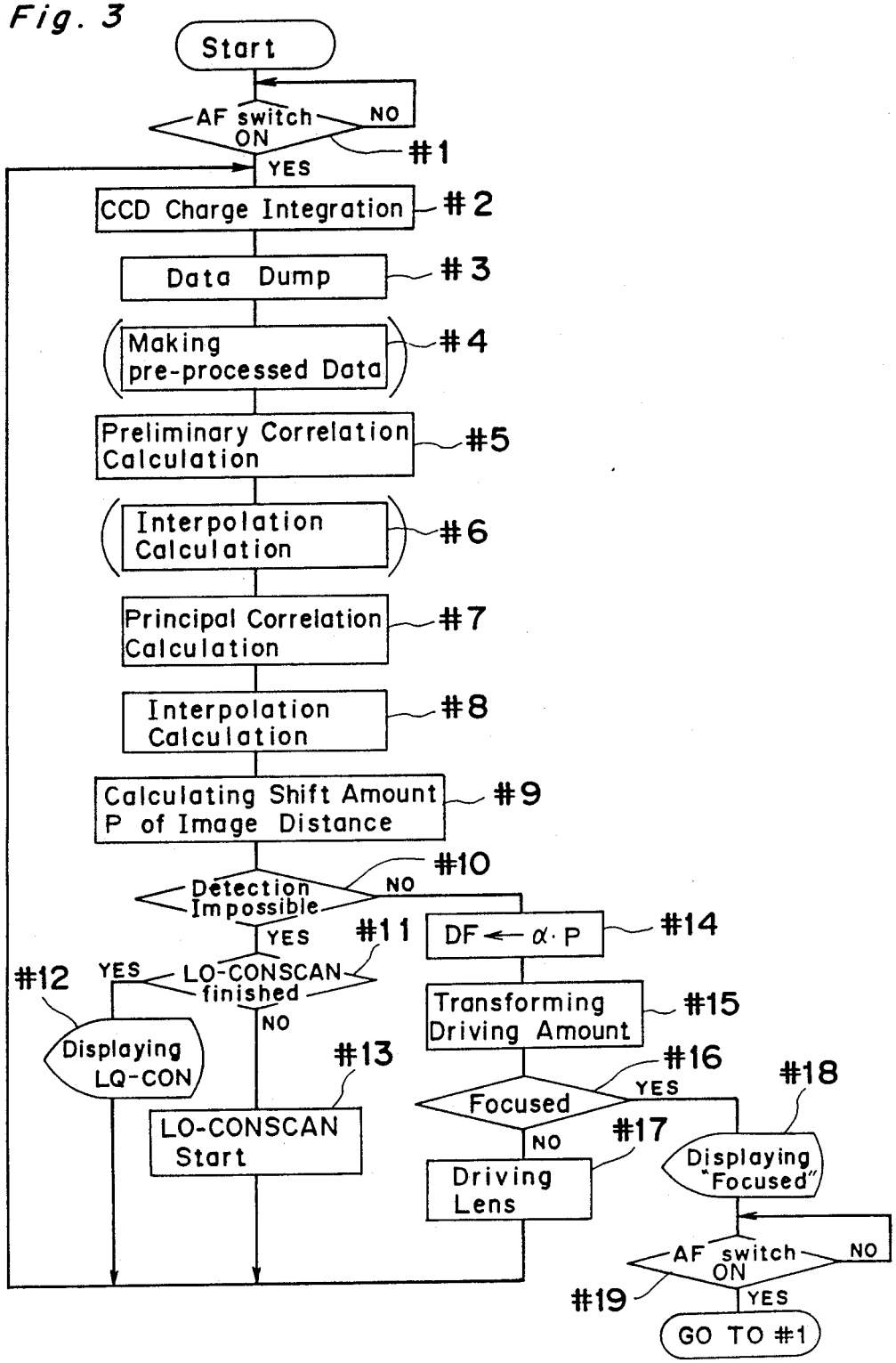
FIG. 3, FIGS. 4(A), 4(B) and FIG. 5 are flow charts of programs for executing automatic focus adjustment, respectively.

FIG. 3 shows a flow chart of a program to be executed by the micro-computer which constitute the control circuit 31 and calculation and dicision circuit 32.

When the power switch (not shown) of the camera is turned ON, the flow is started. At step #1, the process waits until the AF switch is switched ON. When it is switched ON, the control circuit 31 operates CCD image sensor to integrate charges therein at step #2. When the charge integration is finished, each integrated charge is outputted from CCD image sensor as an image signal OS serially at Data Dumpstep #3. Individual image signal OS is substracted with the signal DOS by the subtraction circuit 24 to obtain an element signal. The element signal is amplified with a gain set according to the brightness of an object and, then, is converted to digital data by the A/D convertor 23. The calculation and dicision circuit 32 receives this digital data and data regarding to the gain.

At step #4, pre-processing data for a preliminary correlation calculation is made. An essential object of this process is to make element data for the preliminary correlation calculation having a volume smaller than that of element data for a principal correlation calculation. In order for that, it may be considered to make sum data or differential data between two elements or to make data showing a relation of magnitude between two adjacent element data. Another method is to restrict the number of elements, for example of the standard portion L, of the CCD image sensor used for the preliminary correlation calculation. According to this method, the pre-processing becomes unnecessary.

At step #5, the preliminary correlation calculation is carried out with use of data obtained step #4. This calculation includes the calculation of a plurality of correlation degrees between the first and second element signals given therefor by repeated shifting of the first and second element signals relative to each other and the determination of a highest correlation degree among the calculated correlation degrees and of the number of shifts providing the highest correlation degree. In other words, an image distance between the images on the standard portions L and the reference portion R of the CCD image sensor which gives the highest correlation between simplified or reduced element data of the standard portion L and simplified or reduced element data of the reference portion R is calculated at step #5. A concrete calculation method thereof will be stated hereinafter.

At step #6, an interpolation calculation is carried out in order to obtain data about the image distance with a higher precision. However, since this data is obtained with use of image informations being simplified or reduced in the number, the precision thereof is not enough for driving the objective lens to an exact in-focus position.

At step #7, a principal correlation calculation is carried out. This is defined as a process which includes the calculation of a plurality of correlation degree between the first and second element data being specified or chosen on the basis of the image distance obtained from the preliminary correlation calculation by repeated shifting of the first and second element data relative to one another and the determination of a highest correlation degree among the calculated correlation degrees and of the number of the shifts providing the highest correlation degree. A concrete calculation method thereof will be stated hereinafter. At step #8, an interpolation calculation is carried out in order to make the image distance obtained more exact and, at step #9, a shift amount from the exact image distance is calculated due to the image distance obtained at step #8.

It is to be noted that the total time needed for the correlation calculation can be reduced considerably compared with that of the prior art, since data to be processed in the principal correlation calculation is specified or chosen preriminary.

At step #10, it is decided whether focus condition detection based on the preliminary correlation calculation is possible or not.

If it is decided that the focus condition detection is impossible, the process is proceeded to step #11 in order to execute a low contrasts can (LO-CON SCAN). This LO-CON SCAN is provided for a countermeasure in the case that the shift amount is too large to expect a correct focus condition detection. In this scanning operation, the focus condition detection is carried out while driving the objective lens.

If it is decided at step #11 that LO-CON SCAN has been already finished, there is displayed at step #12 one or more symbols or characters indicating that the focus condition detecting operation is impossible and, then, the process is proceeded back to the charge integration step #2.

If LO-CON SCAN has not been finished, it is started at step #13 and the process is proceeded back to step #2.

On the contrary to the above, if it is decided at step #10 that the focus condition detection is possible, the shift amount of image distance is converted to an amount of defocus at step #14, and further, at step #15, the latter is converted to an amount for driving the lens.

Next, at step #16, it is decided whether the defocus amount or the lens driving amount obtained falls within a predetermined range indicating an in-focus condition.

If it is decided at step #16 that the lens is positioned at an in-focus position, it is displayed at step #18 and, when the AF switch is turned on, the process is proceeded from step #19 to #1. If it is decided that the lens is not positioned at an in-focus position, at step #17, the lens is driven according to the driving amount obtained at step #15 and, when the lens has been driven to a position determined by the driving amount, the process is proceeded back to step #2 for the integration of charge.

Figure 4A:
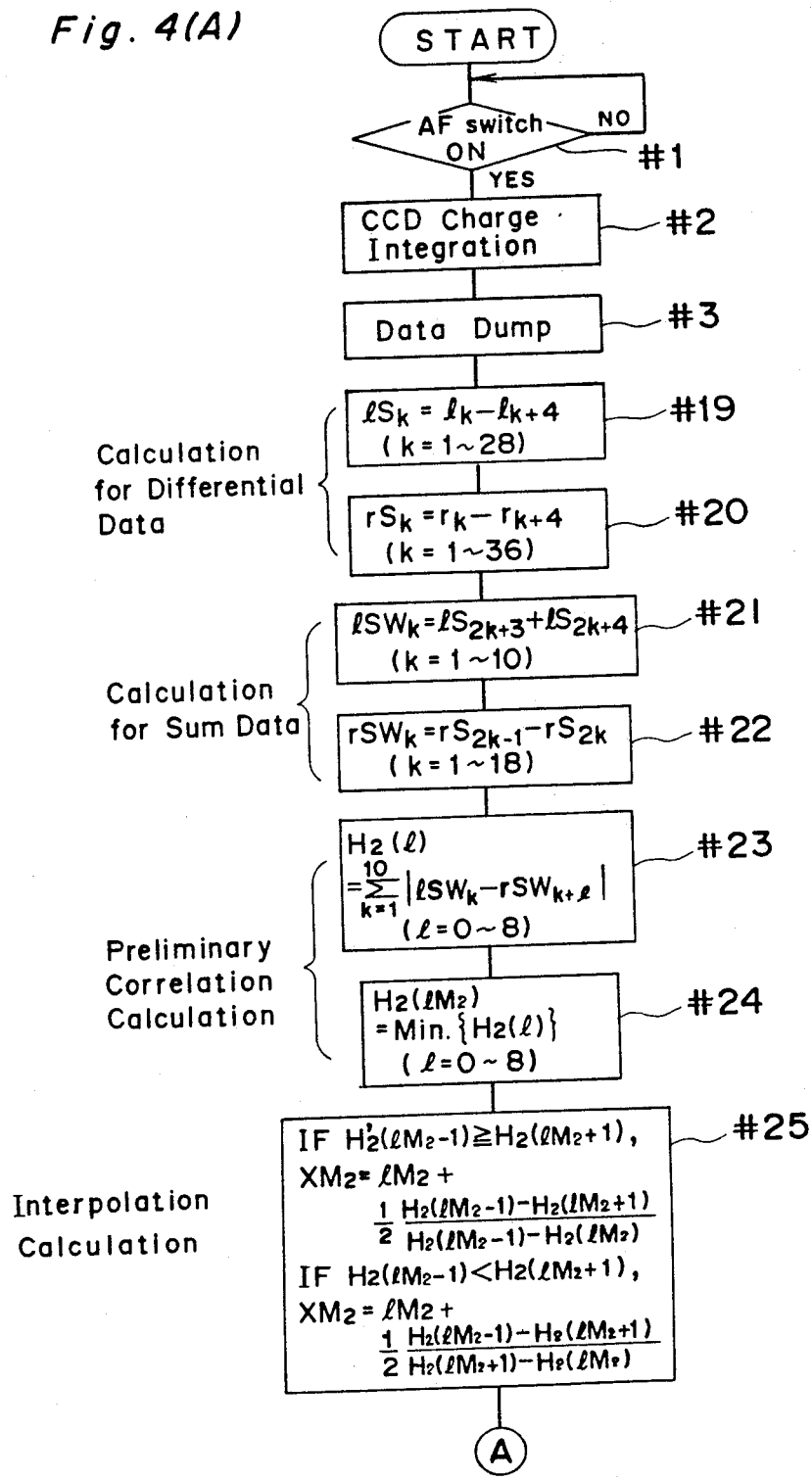
Figure 4B:
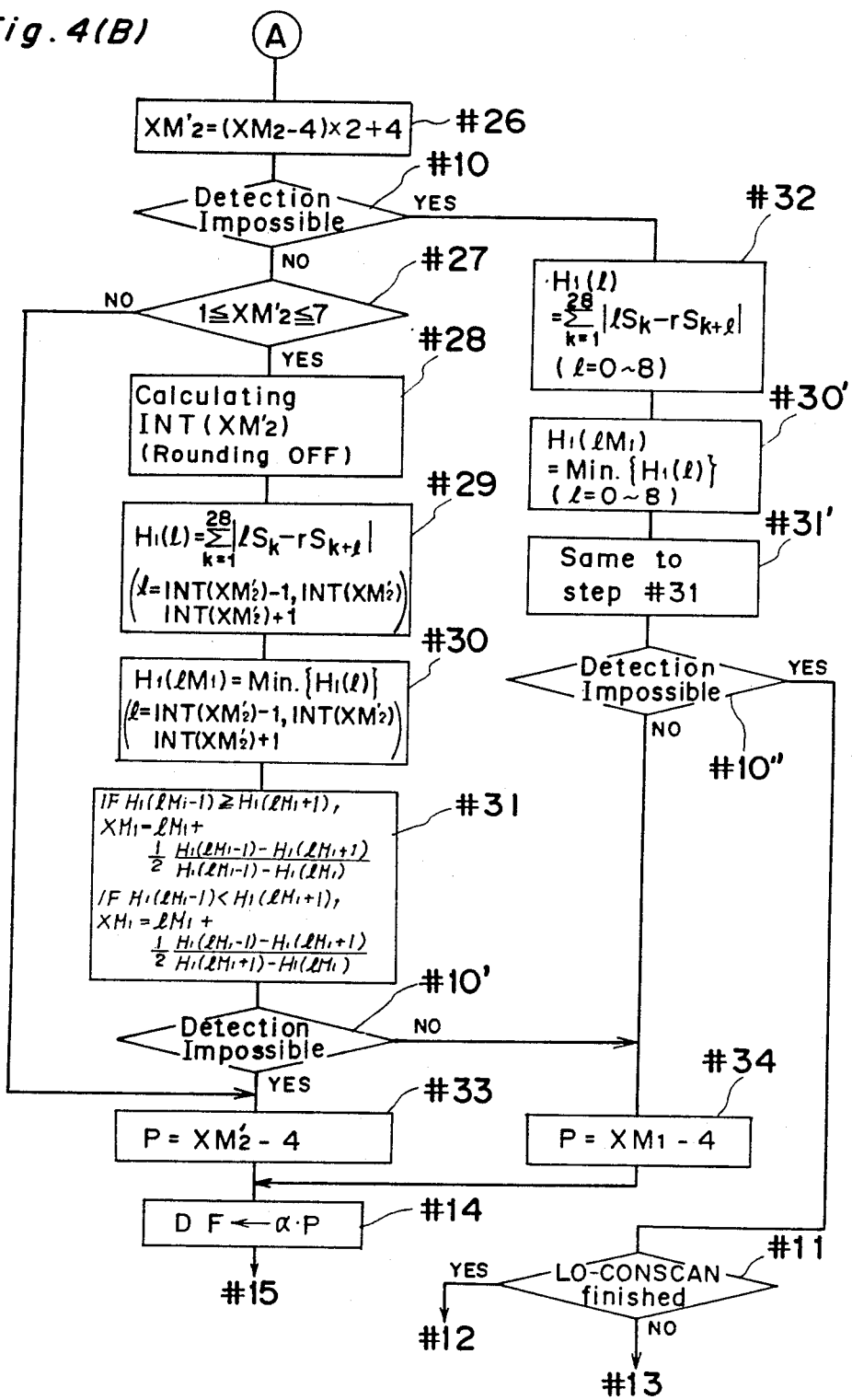

FIG. 4 shows a detail flow chart for showing the preliminary correlation calculation, the interporlation calculation and the principal correlation calculation. In FIG. 4, the same step to that of FIG. 3 is numbered with the same step number. In the pre-processing step according to the present preferred embodiment as shown at step #19, differential data $ls_k$ (wherein k is one of integers from 1 to 28) are made from a difference between the k-th element data $l_k$ and the (k+4)th element data obtained from the standard portion L, respectively. Also, with respect to the element data obtained from the reference portion R, differential data $rs_k$ are calculated at step #20 in a manner similar to that of step #19 (k=1-36). The reason why such calculation is employed is to remove error factors accompanied with low frequency components which are contained as spatial frequency components in the illumination distributions on the standard and reference portions, which are caused due to differences from the specification of the optical system for detecting focus condition. These matters are disclosed in more detail in Ishida et al. copending U.S. patent application Ser. No. 570,012 filed on Jan. 10, 1984 and assigned to the same assignee and are not the subjects of the present inventions. Therefore, further explanation about those will be abreviated in this specification. After the calculations of the differential data $ls_k$, $rs_k$ sum data $lsw_k$ and $rsw_k$ are calculated from those data steps #21 and #22, respectively. This reduces a volume of element data to be used in the preliminary correlation calculation. Also, the volume is further reduced by restricting the area of elements of the standard portion to the second block II thereof ($l_5$-$l_{28}$).

In next table, there are shown areas of the standard and reference portions and element data to be used in the preliminary and principal correlation calculations.

TABLE

|  | Data to be used | | |
| --- | --- | --- | --- |
|  |  | Pre-processed Data | |
| Area | Element Data | Differential Data | Sum Data |
| Standard Portion | | | |
| 1st Block | $l_1$-$l_{32}$ | $ls_1$-$ls_{29}$ | |
| 2nd Block | $l_5$-$l_{28}$ | $ls_5$-$ls_{24}$ | $lsw_1$-$lsw_{10}$ |
| Reference Portion | $r_1$-$r_{40}$ | $rs_1$-$rs_{36}$ | $rsw_1$-$rsw_{18}$ |

As shown in Table, the standard portion L has the first and second blocks (I), (II) and the first block (I) is defined as a block for the principal correlation calculation regarding to which differential data $ls_k$ (k=1-28) are provided as pre-processed data. The second block (II) is defined as a block for the preliminary correlation calculation regarding to which sum data $lsw_k$ (k=1-10) are calculated from differential data as pre-processed data. With respect to the reference portion R, there are provided both of differential data $rs_k$ (k=1-36) and sum data $rsw_k$ (k=1-18).

At step #23, the preliminary correlation calculation for calculating individual correlation function (or degree) $H_2(l)$ is carried out repeatedly according to an equation shown in the box thereof. At step #24, a number (lMx) of shifts namely data regarding to the image distance which gives the highest correlation (Min($H_2(l)$)) is found out from correlation functions ($H_2(l):l1=0-8$) obtained at step #23. Further, at step #25, the data of the image distance is made more precise by executing the interpolation calculation according to equations as shown in the box of step #25.

The data of image distance $XM_2$ obtained according to this step #25 is defined in a unit of the pitch of sum data. As mentioned above, data obtained in the preliminary correlation calculation, however, have not precisions comparable to those obtained in the principal correlation calculation.

Next, at step #26, the image distance data obtained at step #25 is transformed to an image distance with a unit of pich between two adjacent elements.

At step #10, it is decided whether the focus condition detection based on the preliminal correlation calculation is possible or not. In Ishida et al. copending U.S. patent application Ser. No. 735,569 filed on May 17, 1985 and assigned to the same assignee, the correlation calculation, the interpolation calculation and the decision about the impossibility of focus condition detection are disclosed in detail.

If it is decided at step #10 that the focus condition detection is possible, the process is proceeded at step #27 in order to decide whether the data of image distance obtained is data which is obtained in a range in which the principal correlation calculation is needed. In this preferred embodiment, if it is decided that the data of image distance is obtained in the range in which the principal correlation calculation should be done (namely, $1 \leq XM'_2 \leq 7$), the principal correlation calculation is carried out at steps #28, #29 and #30.

However, it is possible to design so as not to execute the principal correlation calculation except the case that $XM_{2'}$ is equal to 4 (this represents that the range is near the in-focus position), since the precision is not demanded so high in the case wherein the range is not near to the in-focus position.

If it is decided at step #27 that the range falls in the range for the principal correlation calculation to be done, the data $XM'_2$ of image distance is rounded off to the first decimal point in order to simplify the data at step #28. This is done in order to shorten a time needed for the calculation.

According to the integer $INT(XM'_2)$ obtained by rounding off $XM'_2$, there are determined three integers (l) $(l=INT(XM'_2)-1, INT(XM'_2), INT(XM'_2)+1)$ in a unit of the pitch of elements one of which might give the highest correlation degree.

At step #29, the principal correlation calculation is executed with use of each of three integers (l) according to the equation difined in the box of step #29. And, the number $lM_1$ of shifts which gives the highest correlation degree is determined according to the equation shown in the box of step #30.

Then, an exact image distance $XM_1$ is calculated according to the interpolation calculation as shown in the box of step #31. At this step #31, the correlation degrees $H_1(lM_1-1)$, $H_1(lM_1+1)$ are re-calculated according to their necessities.

As is apparent from the comparison of step #29 with step #23 of the preliminary correlation calculation, the number of element data used for the principal correlation calculation is far more than that used for the latter and the pitch of elements used for the former is set sufficiently smaller than that of the latter. These contribute to obtain data having a high precision.

Next, at step #10', it is decided whether the focus condition detection is possible or not. If decided possible, at step #34, the shift amount from the specific or criterion image distance specified for the in-focus condition is calculated from the image distance $XM_1$ obtained at step #31 and the process is proceeded to step #14. Steps thereafter are same to those of FIG. 3 and therefore, explanation about those steps are omitted for simplicity.

When it is decided at step #10' that the focus condition detection is impossible, the process is proceeded to step #33 in order to calculate a shift amount CP from the specific or criterion image distance with use of the image distance data $XM'_2$ which is obtained by the preliminary correlation calculation.

Also, when it is decided at step #27 that the principal correlation calculation is unnecessary, the process is skipped to step #33 without executing the calculation.

Further, when it is decided at step #10 that the focus condition detection is impossible even by the preliminary correlation calculation, the process is proceeded to step #32.

At step #32, the principal correlation calculation is repeated over the whole range of the reference portion available for the principal correlation calculation and the number $lM_1$ of shifts is found out at step #30' which gives the highest correlation degree. Then, an interpolation calculation same to that of step #31 is further executed at step #31'.

Next, at step #10", it is decided whether the focus condition detection based on the principal correlation calculation is possible or not.

If it is decided at step #10" that it is possible, a shift amount P of the image distance is calculated with use of the image distance data $XM_1$ obtained at step #31'. If it is decided at step #10" that it is impossible to detect the focus condition, the process is proceeded to step #11 in order to execute LO-CON SCAN as stated with respect to FIG. 3, since the focus condition detection based on both of the preliminary and principal calculations is impossible.

Figure 5:
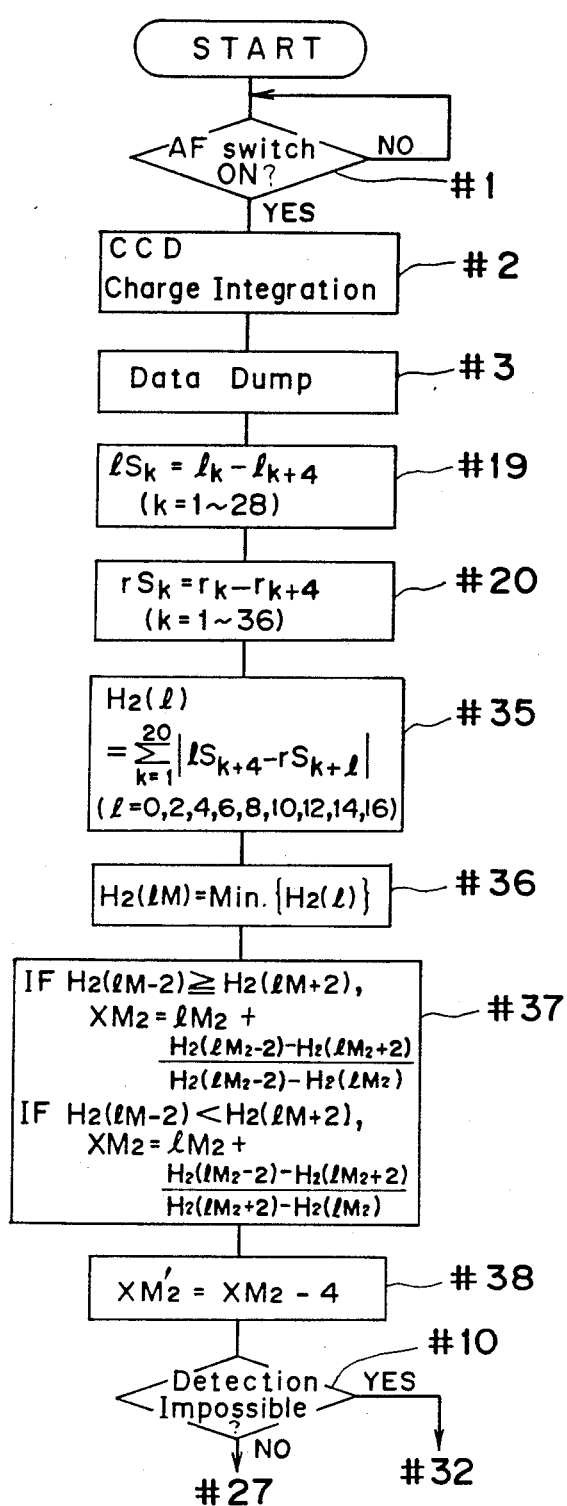
Figure 6:
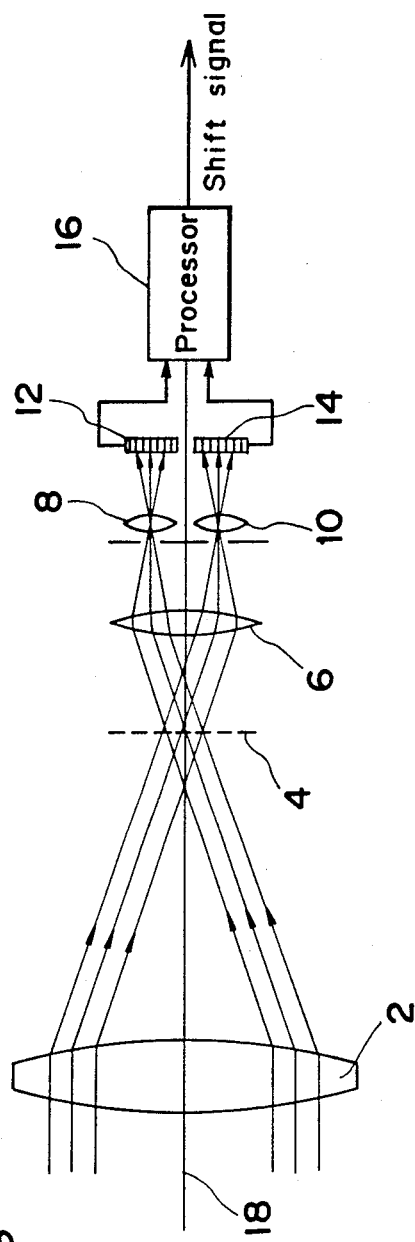
FIG. 6 is an explanative view for showing an optical system used for detecting the focus condition.
Figure 7:
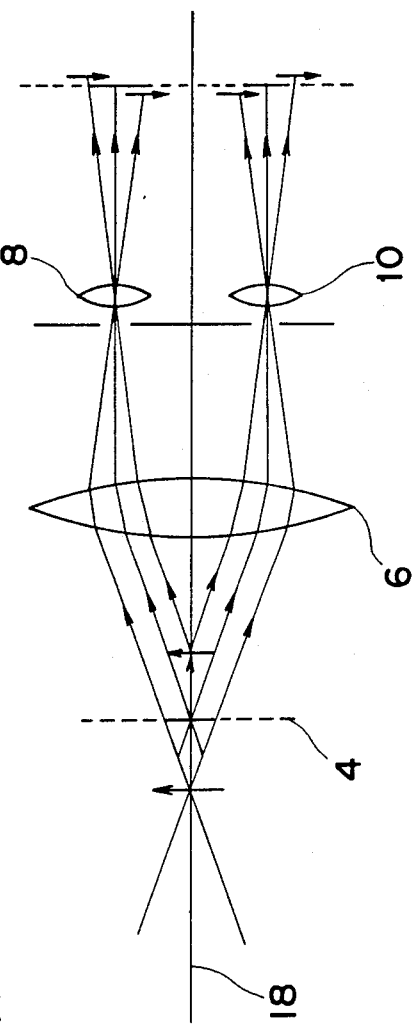
FIG. 7 is an explanative view for showing the priciple for seeking for the focus condition.

FIG. 5 shows another flow chart according to another preferred embodiment. In this preferred embodiment, the pre-processing for the preliminary correlation calculation as mentioned in FIG. 4 is omitted. In place of that, the pitch of the difference outputs $r_k$ of the reference portion R used for executing the preliminary correlation calculation is doubled to that for the principal correlation calculation. Due to this, the time needed for the correlation calculation is shortened.

According to steps from the start to step #20 same to those of FIG. 4, differential data $ls_k$ and $rs_k$ are calculated.

Next, at step #35, the preliminary correlation calculation is carried out with use of the second block of the standard portion. In this calculation, the correlation degree is calculated with use of every two element data of the reference portion R in order to shorten the calculation time.

Then, at step #36, a range in the reference portion R which gives the highest correlation degree is found out according to the result of the preliminary correlation calculation and at step #37, an interpolation calculation is done for obtaining an image distance having a precision higher than that obtained at step #36.

As mentioned above, every two element data is picked up in the range of the reference portion in order for the preliminary correlation calculation. Since this is equivalent to the case that the pitch of elements used in the preferred embodiment of FIG. 4 is made double, and, accordingly the gradient of a straight line for the interpolation calculation becomes to one half of that of FIG. 4, the coefficients in the equations for the interpolation calculation is made double as shown in the box of step #37.

In this preferred embodiment, the precision about the image distance data obtained by the preliminary correlation calculation may be lowered, since the pitch used therefor is set roughly. However, the precision in the auto-focusing adjustment is kept high, since the objective lens is driven by data having a high precision which is calculated from the image distance of a high precision obtained by the principal correlation calculation.

Next, at step #38, the image distance data $XM_2$ obtained with use of the second block of the standard portion (L) is transformed to an equivalent data $XM'_2$ on the basis of the first block (I) of the standard portion.

Then, at step #10, it is decided whether the focus condition detection is possible or not and thereafter, processing steps similar to those of FIG. 4 are executed.

While there has been described the preferred embodiments, modifications and variations being obvious to those skilled in the art are possible without departing from the spirit of the invention. The scope is therefore to be determined solely by the appended claims.

What is claimed is:

1. A focus condition detecting device for a camera having an objective lens for forming an image of an object, comprising:
   optical means for forming first and second object images so that the distance between the first and second object images varies with the focus condition of the object image formed by the objective lens;
   first and second image signal generating means having first and second sensors positioned to receive the first and second object images and adapted to generate first and second image signals corresponding to the light intensity distributions of the first and second object images on the first and second sensors, respectively;
   preliminary correlation calculation means for effecting a preliminary correlation calculation which includes calculation of a plurality of correlation degrees between the first and second image signals with a predetermined lower accuracy by repeated shifting of the first and second image signals relative to one another and determination of a highest correlation degree among the calculated correlation degrees and of the number of the shifts providing the highest correlation degree;
   principal correlation calculation means for effecting a principal correlation calculation which includes calculation of a plurality of correlation degrees between the first and second image signals with a predetermined higher accuracy by repeated shifting of the first and second image signals relative to one another and determination of a highest correlation degree among the calculated correlation degrees and of the number of the shifts providing the highest correlation degree;
   means for determining the range of the shifts for the calculation of the plurality of correlation degrees in the principal correlation calculation in accordance with the number of the shifts determined by the preliminary correlation calculation means; and
   means for generating a focus condition detection signal representative of the focus condition of the object image formed by the objective lens, based on the number of the shifts determined by the principal correlation calculation means.

2. A focus condition detecting device as defined in claim 1, wherein the shifting of the first and second image signals relative to one another for the calculation of the plurality of correlation degrees in the principal correlation calculation is effected at a first pitch whereas that for the calculations of the plurality of correlation degrees in the preliminary correlation calculation is effected at a second pitch which is larger than the first pitch.

3. A focus condition detecting device as defined in claim 1, wherein the shift range determining means determines the range of the shifts for the calculation of the plurality of correlations so as to be smaller than the range of the shifts for the calculation of the plurality of correlation degrees in the preliminary correlation calculation.

4. A focus condition detecting device as defined in claim 1, wherein the shift range determining means includes means for restricting the range of the shifts for the calculation of the plurality of correlation degrees in the principal correlation calculation to a predetermined range within an entire range available for the calculation of the plurality of correlation degrees in the principal correlation calculation, the predetermined range including the number of the shifts determined by the preliminary correlation calculation.

5. A focus condition detecting device as defined in claim 1, wherein the first and second image signals are constituted by a predetermined number of element signals, respectively, and wherein the number of the element signals used for the calculation of the plurality of correlation degrees in the preliminary correlation calculation is smaller than that of the element signals used for the calculation of the plurality of correlation degrees in the principal correlation calculation.

6. A focus condition detecting device as defined in claim 5, wherein each of the first and second sensors includes a plurality of sensing elements capable of providing individual outputs, and wherein the first and second image signal generating means includes:
   difference outputs producing means for producing difference outputs represented by equations $ls = l_k - l_{k+m}$ and $rs = r_k - r_{k+m}$, where $l_k$ and $r_k$ represent the output of the k-th sensing element of the first and second sensors, respectively, and $l_{k+m}$ and $r_{k+m}$ represent the output of the (k+m)th sensing element of the first and second sensors, respectively; and
   sum outputs producing means for producing sum output represented by equations $lsw_k = ls_k + ls_{k+n}$ and $rsw = rs_k + rs_{k+n}$;
   and wherein the difference outputs are the element signals used for the calculation of the plurality of correlation degrees in the principal calculation whereas the sum outputs are the element signals used for the calculation of the plurality of correlation degrees in the preliminary correlation calculation.

7. A focus condition detecting device as defined in claim 3, further comprising means for determining whether or not the number of the shifts determined by the preliminary correlation calculation means falls within the range of the shifts available for the calculation of the plurality of correlation degrees in the principal correlation calculation, and wherein the focus condition signal generating means is adapted to generate the focus condition signal based on the number of the shifts determined by the preliminary correlation calculation means when the determination by the determining means indicates that the number of the shifts determined by the preliminary correlation calculation does not fall within the range of the shifts available for the calculation of the plurality of correlation degrees in the principal correlation calculation.

8. A focus condition detecting device as defined in claim 4, further comprising means for determining, based on the highest correlation determined by the preliminary correlation calculation means, whether the focus condition detection is expected to be impossible or not, and wherein the shift range determining means includes means for setting the range of the shift for the calculation of the plurality of correlation degrees in the principal correlation calculation to the entire range available therefor when the determination by the principal correlation calculation by the determining means indicates that the focus condition detection is expected to be impossible.

9. A focus condition detecting device as defined in claim 4, wherein the shift range restricting means is adapted to restrict the range of the shift for the calculation of the plurality of correlation degrees in the principal correlation calculation means to k, k+1 and k−1, wherein k represents the number of the shifts determined by the preliminary correlation calculation means.

10. In a camera having an objective lens for forming an image of an object, the improvement comprising:
   means for forming first and second object images that vary with the focus condition of the object image formed by the objective lens;
   first and second image signal generating means having first and second sensors positioned to receive the first and second object images and adapted to generate first and second image signals corresponding to the light intensity distributions of the first and second object images on the first and second sensors, respectively;
   preliminary correlation calculation means for effecting a preliminary correlation calculation which includes calculation of a plurality of correlation degrees between the first and second image signals with a predetermined lower accuracy by repeated shifting of the first and second image signals relative to one another and determination of a highest correlation degree among the calculated correlation degrees and of the number of the shifts providing the highest correlation degree;
   principal correlation calculation means for effecting a principal correlation calculation which includes calculation of a plurality of correlation degrees between the first and second image signals with a predetermined higher accuracy by repeated shifting of the first and second image signals relative to one another and determination of a highest correlation degree among the calculated correlation degrees and of the number of the shifts providing the highest correlation degree;
   means for determining the range of the shifts for the calculation of the plurality of correlation degrees in the principal correlation calculation in accordance with the number of the shifts determined by the preliminary correlation calculation means; and
   means for generating a focus condition detection signal representative of the focus condition of the object image formed by the objective lens, based on the number of the shifts determined by the principal correlation calculation means.

11. A camera as defined in claim 10, wherein each of the first and second sensors includes a plurality of sensing elements capable of providing individual outputs, and wherein the first and second image signal generating means includes:
   different outputs producing means for producing difference outputs represented by equations $ls = l_k - l_{k+m}$ and $rs = r_k - r_{k+m}$, where $l_k$ and $r_k$ represent the output of the k-th sensing element of the first and second sensors, respectively, and $l_{k+m}$ and $r_{k+m}$ represent the output of the (k+m)th sensing element of the first and second sensors, respectively; and
   sum output producing means for producing sum outputs represented by equations $lsw_k = ls_k + ls_{k+n}$ and $rsw = rs_k + rs_{k+n}$;
   and wherein the difference outputs are the element signals used for the calculation of the plurality of correlation degrees in the principal calculation whereas the sum outputs are the element signals used for the calculation of the plurality of correlation degrees in the preliminary correlation calculation.

* * * * *